United States Patent [19]
Kim et al.

[11] Patent Number: 5,795,676
[45] Date of Patent: Aug. 18, 1998

[54] BATTERY

[75] Inventors: Kang-jae Kim, Suwon; Su-suk Choi, Pyungtaek, both of Rep. of Korea

[73] Assignee: Samsung Display Devices Co., Ltd., Kyungki-do, Rep. of Korea

[21] Appl. No.: 753,088

[22] Filed: Nov. 20, 1996

[30] Foreign Application Priority Data

Apr. 30, 1996 [KR] Rep. of Korea .................. 1996 13903

[51] Int. Cl.$^6$ .................................................. H01M 2/02
[52] U.S. Cl. .................................. 429/164; 429/176
[58] Field of Search ......................... 429/164, 165, 429/174, 176

[56] References Cited

U.S. PATENT DOCUMENTS

| | | | |
|---|---|---|---|
| 352,877 | 11/1886 | Leland | 429/164 |
| 2,458,878 | 1/1949 | Ruben | 429/164 X |
| 4,288,843 | 9/1981 | Schroeder | 429/164 X |
| 4,340,653 | 7/1982 | Adams | 429/164 X |
| 4,732,826 | 3/1988 | Hardigg | 429/176 |

*Primary Examiner*—Stephen Kalafut
*Attorney, Agent, or Firm*—Leydig, Voit & Mayer, Ltd.

[57] ABSTRACT

A battery assembly having an improved case, simplifying manufacture, includes a tubular case having an internal space, an open end, a closed end, a cell element in the internal space of the case, and a cap closing the open end of the case, wherein the internal sectional dimension of the case is largest at the open end and smallest as the closed end while the external dimensions of the case are uniform. The change in internal dimensions may be provided by a tapering thickness of the case. Because of the tapered opening within the case, the cell element is easily inserted into the case.

5 Claims, 2 Drawing Sheets

BATTERY

BACKGROUND OF THE INVENTION

The present invention relates to a battery having an improved case structure.

A battery having a cylindrical case or a case of a square cross-section is widely used in various electronic products.

FIG. 1 is an exploded perspective view showing a general structure of a conventional battery.

As shown, the conventional battery includes a cylindrical case 2, a cell element 1 in the case 2, and a cap 3. The cell element 1 includes a positive plate 1c coated with a positive active material, a negative plate 1a coated with a negative active material, and a partition plate 1b for insulating the positive plate 1c from the negative plate 1a. The positive plate 1c, the partition plate 1b, and the negative plate 1a are wound as a roll and loaded in the case 2 after being stacked in the order described. With the cell element 1 loaded, an aperture of the case 2 is closed by the cap 3.

In the above process for manufacturing the battery, the charging element 1 generally occupies about 95% of the internal space of the case 2, considering the charging capacity of the cell element. However, according to the conventional case 2, since an internal diameter is uniformly with height, there are the following problems. First, it is hard to insert the charging element 1 into the case 2. Second, in the case of forcibly inserting the cell element 1 into the case, the positive and negative plates 1a and 1c may be torn or the active material may be undesirably removed. In the manufacturing process of the conventional battery, defects generated in the step of inserting the charging element 1 into the case 2 have a significant influence on the quality of the entire manufacturing process. Also, it took much time for the entire process due to the difficulties in inserting the cell element 1 into the case 2.

To solve such problems, the internal diameter of the case must be much larger than an outer circumference of the cell element 1 formed in a roll to smoothly insert the cell element 1 into the case 2. However, since the charging capacity of the battery is proportional to the volume of the cell element 1, to simply increase the volume of the space of the case 2 does not meet a requirement of a product in which the charging capacity should be increased even though the battery is decrease in size.

SUMMARY OF THE INVENTION

It is an object of the present invention to provide a battery having an improved case structure whereby a cell element can easily be inserted into the battery case.

To achieve the above object, there is provided a battery, comprising a cylindrical case having an internal space and an aperture, a cell element loaded in the internal space of the case, and a cap for closing the aperture of the case loaded with the cell element, wherein a sectional size of the aperture is larger than that of a bottom surface of the internal space in the case.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

Hereinafter, a preferred embodiment according to the present invention is described in detail with reference to the attached drawings.

Figure 1:
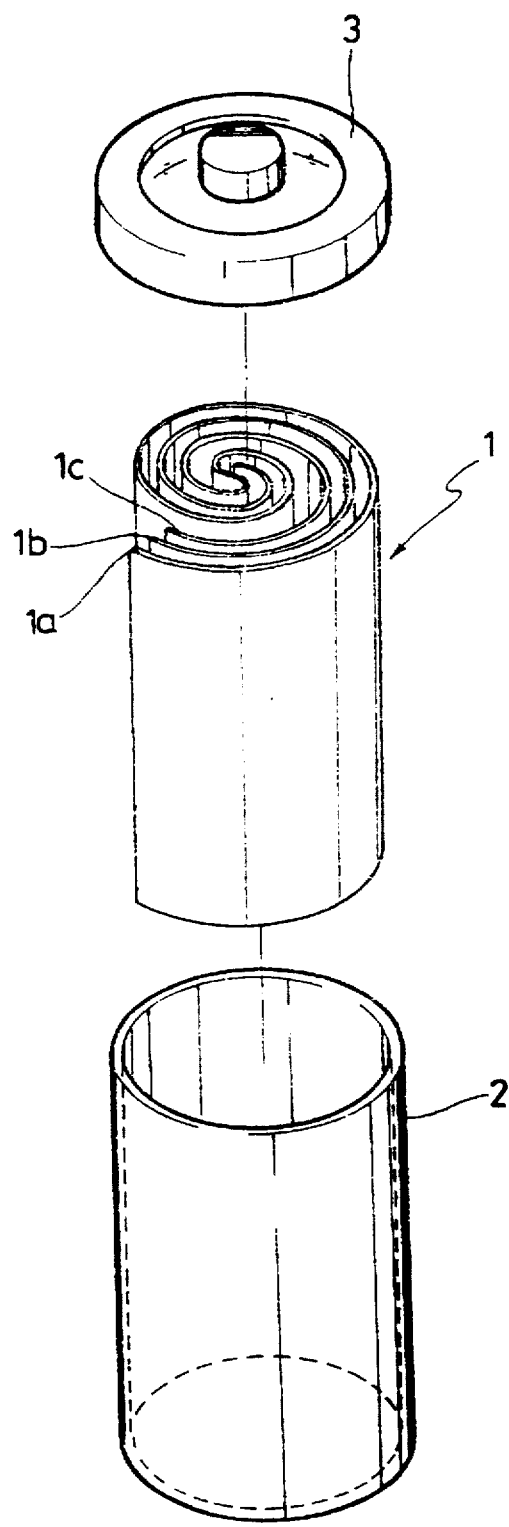
FIG. 1 is an exploded perspective view of a conventional battery.
Figure 2:
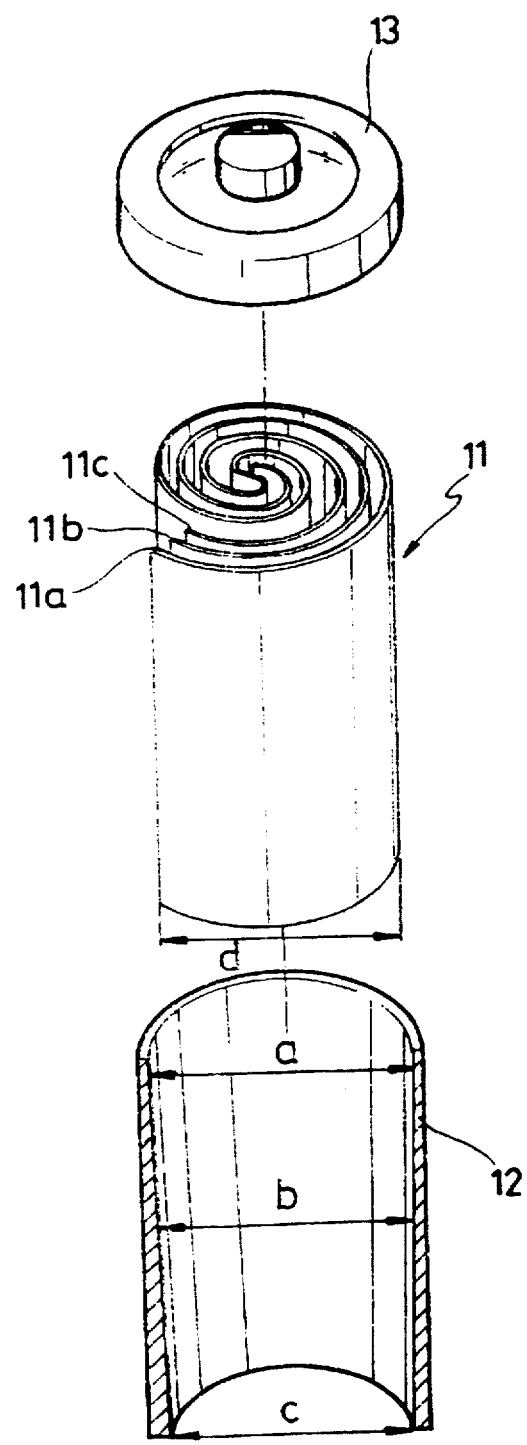
FIG. 2 is an exploded perspective view, including a partial sectional view, of the battery according to the present invention.

Referring to FIG. 2, a battery according to the embodiment of the present invention includes a cell element 11, a case 12 in which the cell element 11 is loaded, and a cap 13 for closing the case 12 loaded with the cell element 11.

The cell element 11 is formed by stacking and winding a positive plate 11c coated with a positive active material, a negative plate 11a coated with a negative active material, and a partition plate 11b for insulating the positive plate 11c from the negative plate 11a in a roll type as in the conventional technology.

The diameter of the internal space of the case 12 in which the cell element 11 is loaded varies according to the height from a bottom surface thereof. Preferably, the internal diameter of the case 12 is maximized at an aperture and increases in a uniform inclination from the bottom surface.

The internal diameter c of the bottom surface of the case 12 is preferably maintained the same as the external diameter d of the cell element 11 stacked in a roll type. An internal diameter b in the middle position from the bottom surface of the case 12 is preferably larger than the internal diameter c of the bottom surface by about 1 to 2%. The internal diameter a at the aperture is preferably larger than the internal diameter c of the bottom surface by about 2 to 4%.

The shown case 12 is described as having a cylindrical shape, however, also in the battery having a square cross-section case, the insertion of the cell element is made easier.

Therefore, when inserting the cell element 11 into the case 12 having the tapered internal structure, it is possible to easily insert the cell element 11 to the case 12, unlike the conventional battery, and to prevent the active material from being removed.

It is preferable that the sectional size of an external shape of the case be uniform.

The present invention is described with regard to a battery having an improved case structure, however, the case design of the present invention can be applied to a capacitor including a charging element consisting of positive and negative plates which are rolled and with an electrolyte or a dielectric between or coating the plates.

As mentioned above, using the improved case structure according to the present invention, problems occurring during assembly are decreased since the insertion of the cell element 11 is made easier without reducing the volume ratio of the cell element 11 to the volume in the case 12.

What is claimed is:

1. A battery assembly comprising:

a tubular case having an internal space, an open end, and a closed end;

a cell element loaded in the internal space of said case; and a cap covering the open end of said tubular case, Wherein the open end of said tubular case has a first internal sectional dimension and the closed end of tubular said case has a second internal sectional dimension, the second internal sectional dimension being smaller than the first internal sectional dimension and said tubular case has a uniform external sectional dimension.

2. The battery assembly as claimed in claim 1 wherein a wall of said tubular case is uniformly tapered in thickness from the closed end to the open end.

3. The battery assembly as claimed in claim 1 wherein said tubular case has a circular cross-section.

4. The battery assembly as claimed in claim 3 wherein the first internal sectional dimension is a first internal diameter, the second internal sectional dimension is a second internal diameter, and the external dimension is an external diameter.

5. The battery assembly as claimed in claim 4 wherein the first internal diameter is 2 to 4 percent larger than the second internal diameter.

* * * * *